(12) United States Patent
Yang et al.

(10) Patent No.: US 10,248,627 B2
(45) Date of Patent: Apr. 2, 2019

(54) METHOD FOR STORING IMAGE OF VEHICLE BLACK BOX

(71) Applicant: CENTER FOR INTEGRATED SMART SENSORS FOUNDATION, Daejeon (KR)

(72) Inventors: Jin Young Yang, Seoul (KR); Chai Yeol Rim, Seoul (KR); Kang Yi, Pohang-si (KR); Chong Min Kyung, Daejeon (KR)

(73) Assignee: CENTER FOR INTEGRATED SMART SENSORS FOUNDATION, Deajeon (KR)

( * ) Notice: Subject to any disclaimer, the term of this patent is extended or adjusted under 35 U.S.C. 154(b) by 317 days.

(21) Appl. No.: 15/124,349

(22) PCT Filed: Mar. 4, 2015

(86) PCT No.: PCT/KR2015/002082
§ 371 (c)(1),
(2) Date: Sep. 7, 2016

(87) PCT Pub. No.: WO2015/137657
PCT Pub. Date: Sep. 17, 2015

(65) Prior Publication Data
US 2017/0031906 A1  Feb. 2, 2017

(30) Foreign Application Priority Data
Mar. 13, 2014  (KR) .......................... 10-2014-0029599

(51) Int. Cl.
*G06F 16/51* (2019.01)
*G06F 16/2455* (2019.01)
(Continued)

(52) U.S. Cl.
CPC ........ *G06F 16/51* (2019.01); *G06F 16/24561* (2019.01); *G06T 1/0007* (2013.01);
(Continued)

(58) Field of Classification Search
CPC combination set(s) only.
See application file for complete search history.

(56) References Cited

U.S. PATENT DOCUMENTS

| 2007/0273709 A1* | 11/2007 | Kimura | G09G 5/397 345/619 |
| 2010/0110190 A1 | 5/2010 | Her | |
| 2013/0126703 A1* | 5/2013 | Caulfield | H04N 5/30 250/206 |

FOREIGN PATENT DOCUMENTS

| KR | 10-0768942 B1 | 10/2007 |
| KR | 10-0836073 B1 | 6/2008 |

(Continued)

OTHER PUBLICATIONS

International Search Report for PCT/KR2015/002082 dated May 20, 2015 from Korean Intellectual Property Office.

*Primary Examiner* — Shyue Jiunn Hwa
(74) *Attorney, Agent, or Firm* — Revolution IP, PLLC

(57) ABSTRACT

A method for storing an image of a vehicle black box comprises: an image input step for inputting an image through a camera module; a temporary storage step for temporarily storing the inputted image in a temporarily processing unit, which consumes relatively low power, and allowing an event processing unit, which consumes relatively high power, to be in a sleep state or a power-off state; and an event storage step for allowing the event processing unit to be returned from the sleep state or the power-off state and storing in the event processing unit an image for the event from the time of the event occurrence up until before (Continued)

<Conventional common vehicle black box> a predetermined time and from the time of the event occurrence up until after a predetermined time.

11 Claims, 12 Drawing Sheets

(51) Int. Cl.
    *G07C 5/08*         (2006.01)
    *G06T 1/00*         (2006.01)
    *G06T 1/20*         (2006.01)

(52) U.S. Cl.
    CPC .............. *G06T 1/20* (2013.01); *G07C 5/0866* (2013.01); *Y02D 10/45* (2018.01)

(56) References Cited

FOREIGN PATENT DOCUMENTS

| KR | 10-2008-0101402 A | 11/2008 |
|----|-------------------|---------|
| KR | 10-1047538 B1     | 7/2011  |
| KR | 10-1157052 B1     | 7/2012  |

\* cited by examiner

<Conventional common vehicle black box>

<Vehicle black box of present invention>

<State of black box before event is generated>

<Flow of image data when event is generated according to first embodiment>

<Flow of image data when event is generated according to second embodiment>

<Flowchart according to third embodiment>

<Flow of image data when event is generated according to third embodiment>

METHOD FOR STORING IMAGE OF VEHICLE BLACK BOX

CROSS REFERENCE TO PRIOR APPLICATIONS

This application is a National Stage Application of PCT International Patent Application No. PCT/KR2015/002082 filed on Mar. 4, 2015, under 35 U.S.C. § 371, which claims priority to Korean Patent Application No. 10-2014-0029599 filed on Mar. 13, 2014, which are all hereby incorporated by reference in their entirety.

TECHNICAL FIELD

The present invention relates to a method for storing an image in a vehicle black box and, more particularly, to a method for storing an image in a vehicle black box, wherein consumed power can be reduced when an event is not detected while the vehicle black box operates in parking mode.

BACKGROUND ART

In a vehicle black box system including an image storage device, when an impact is applied to a vehicle or a specific event, such as sudden brake, is generated, the image data of the outside or inside of a vehicle is recorded and stored.

The vehicle black box system processes image captured by a camera provided toward the outside or inside of a vehicle using power supplied from a vehicle battery and then stores the processed image in a storage medium.

In a method for storing an image according to the detection of an event in the vehicle black box system, in order to sense an event, various sensors, such as a gyroscope sensor, an acceleration sensor, an angular velocity sensor, an impact sensor, and a vibration sensor, may be used.

Accordingly, in the vehicle black box system, a threshold has been previously set or has been directly set by a user, and thus an event may be recognized as having been generated only when a value measured by a sensor exceeds the corresponding threshold.

That is, it is determined whether a value measured by the sensor is a predetermined threshold or more while the sensor is monitored. If, as a result of the determination, the measured value does not exceed the threshold, an event is considered to have not been generated.

If, as a result of the determination, the measured value exceeds the threshold, however, an event is considered to have been generated. The image data of the outside or inside of the vehicle is recorded and stored using an image storage device included in the vehicle black box system.

Furthermore, if a storage space is not sufficient due to limits to the capacity of a storage device 50, the oldest image is deleted and overwritten by a new image. Accordingly, there was a problem in that the vehicle black box system does not play its unique role because data including an image at the time of an accident, such as an actual impact event, is deleted.

Accordingly, storage efficiency of an inputted image is increased using a heavy weight compression scheme, such as H.264, through a codec 30.

However, there was a problem in that great power is consumed because much operation and much memory access are required to use heavy weight compression.

Moreover, image data for a specific time before and after a motion sensing event or an impact event is generated when the event is generated while the vehicle black box system operates in parking mode has to be recorded and stored.

That is, the vehicle black box continues to temporarily store images, voices, and other data because when an event is generated is unknown. Accordingly, there was a problem in that consumed power is not greatly reduced compared to a case where a vehicle drives because accessories, such as a camera module 10, the codec 30, and the storage device 50 forming the vehicle black box as shown in FIG. 1, operate.

PRIOR ART DOCUMENT (Patent Document 1) Korean Patent No. 10-1047538

DISCLOSURE

Technical Problem

Accordingly, the present invention has been made to solve the above problems, and an object of the present invention is to provide a method for storing an image in a vehicle black box, which can reduce power consumed by the vehicle black box because an event processing unit consuming relatively high power becomes a sleep state or a power-off state and instead a temporary processing unit consuming relatively low power is separately configured to store an image before an event is generated, when an event is not generated in parking mode of the vehicle black box.

Technical Solution

A method for storing an image in the vehicle black box according to the present invention for achieving the above object includes (a) the image input step in which an image is inputted through a camera module; (b) a temporary storage step in which, when the generation of an event is not detected in the image inputted through the image input step, the inputted image is temporarily stored in a temporary processing unit consuming relatively low power and an event processing unit consuming relatively high power becomes a sleep state or a power-off state; and (c) an event storage step in which, when the generation of an event is detected in the image inputted through the image input step after the temporary storage step, the event processing unit returns from the sleep state or the power-off state and stores images of the event for a specific time before the event is generated and for a specific time after the event is generated in the event processing unit.

In the event storage step, the images of the event for the specific time before the event is generated and for the specific time after the event is generated, including the image temporarily stored in the temporary processing unit, may be stored in the event processing unit.

The event storage step may include transferring an image subjected to light weight compression and temporarily stored in the temporary processing unit for a specific time before the event is generated to the event processing unit and storing the light weight-compressed image, and performing, by the event processing unit, heavy weight compression on an image inputted to the camera module for a specific time after the event is generated and storing the heavy weight-compressed image.

The event storage step may include performing, by the event processing unit, heavy weight compression on an image inputted to the camera module for a specific time after the event is generated and storing the heavy weight-compressed image, and transferring an image subjected to light weight compression and temporarily stored in the temporary processing unit for a specific time before the event is generated to the event processing unit, performing heavy weight compression on the transferred image, and then storing the heavy weight-compressed image.

When a new event is generated before the storage of the image of the event is completed, the event storage step may further include performing, by the temporary processing unit, light weight compression on an image of the new event inputted to the camera module until the storage of the image of the event is completed and temporarily storing the light weight-compressed image; and thereafter performing, by the event processing unit, heavy weight compression on an image of the new event inputted to the camera module after the storage of the image of the event is completed, storing the heavy weight-compressed image, transferring the image of the new event temporarily stored in the temporary processing unit to the event processing unit, performing heavy weight compression on the transferred image, and storing the heavy weight-compressed image.

The event storage step may include performing, by the temporary processing unit, light weight compression on the images of the event for the specific time before the event is generated and for the specific time after the event is generated and temporarily storing the light weight-compressed images, and transferring the light weight-compressed images temporarily stored in the temporary processing unit to the event processing unit, performing heavy weight compression on the images, and storing the heavy weight-compressed images in the event processing unit.

When a new event is generated before the storage of the image of the event is completed, the event storage step may further include performing, by the temporary processing unit, light weight compression on an image of the new event inputted to the camera module until the storage of the image of the event is completed and temporarily storing the light weight-compressed image; transferring the image of the new event temporarily stored in the temporary processing unit to the event processing unit, performing heavy weight compression on the transferred image, and storing the heavy weight-compressed after the storage of the image of the event is completed; and performing, by the temporary processing unit, light weight compression on the image of the new event inputted to the camera module, temporarily storing the light weight-compressed image, performing, by the event processing unit, heavy weight compression on the light weight-compressed image and storing the heavy weight-compressed image.

The event storage step may further include decoding the light weight-compressed image temporarily stored in the temporary processing unit and transferring the decoded image to the event processing unit.

Advantageous Effects

In accordance with the method for storing an image in the vehicle black box according to the present invention, such as that described above, the event processing unit consuming relatively high power becomes a sleep state or a power-off state when an event is not generated in parking mode of the vehicle black box, and instead the temporary processing unit consuming relatively low power is separately configured to store an image prior to the generation of an event. Accordingly, there is an advantage in that power consumed by the vehicle black box can be reduced.

DESCRIPTION OF REFERENCE NUMERALS

Figure 1:
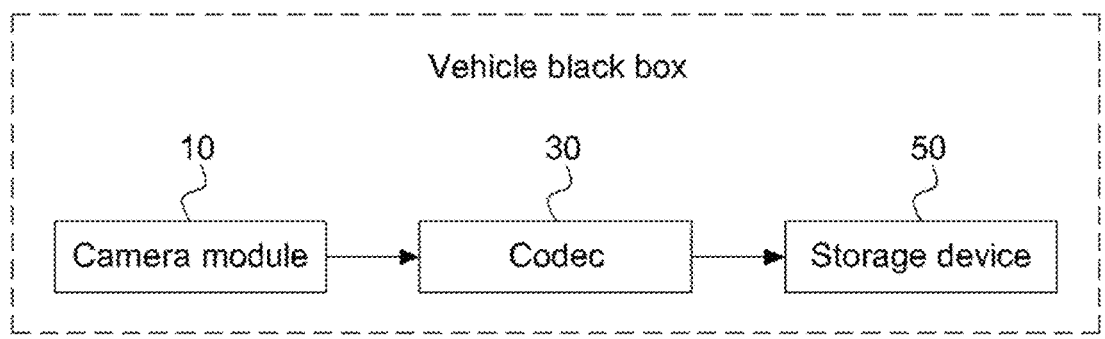
FIG. 1 is a block diagram showing a conventional vehicle black box.

100: camera module
500: temporary processing unit
510: first codec
550: first temporary storage unit
700: event processing unit
710: second codec
750: second temporary storage unit
770: main storage unit

MODE FOR INVENTION

Hereinafter, preferred embodiments of the present invention are described in detail with reference to the accompanying drawings in order to describe the present invention in detail so that those skilled in the art to which the present invention pertains may easily practice the present invention.

Figure 2:
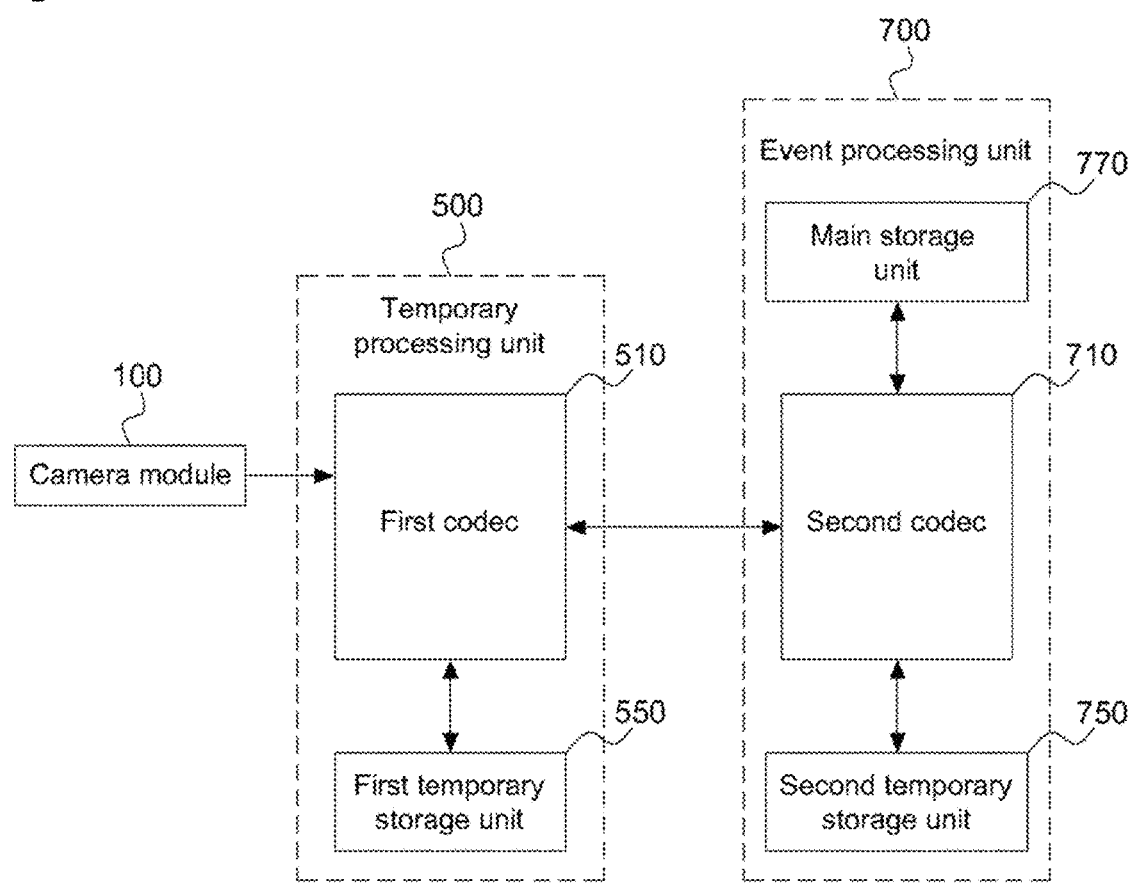
FIG. 2 is a block diagram showing a vehicle black box according to the present invention.

The image storage system of a vehicle black box according to the present invention is configured to include a camera module 100, a temporary processing unit 500 configured to include a first codec 510 and a first temporary storage unit 550, an event processing unit 700 configured to include a second codec 710, a second temporary storage unit 750, and a main storage unit 770, as shown in FIG. 2.

The camera module 100 corresponds to a camera installed on the black box device of a vehicle and may capture images in the front, back, and side of the vehicle.

In this case, a conventional black box system commonly adopts the second codec 710, the second temporary storage unit 750, and the main storage unit 770, which consume specific power because they are configured to always operate regardless of the generation of an event.

Accordingly, when the vehicle is in parking mode, the black box system stores input of the camera module 100 in a temporary storage unit through compression by which high power is consumed although an event is actually not generated.

Accordingly, consumption power can be significantly reduced if an operational structure for compression and storage with low consumption power is adopted and the second codec 710, the second temporary storage unit 750, and the main storage unit 770 which consume high power become a sleep state or a power-off state while an event is not generated.

In order to solve such a problem, only the first codec 510 and the first temporary storage unit 550 driven by relatively low power before an event is generated are made to operate, thereby reducing consumed power.

The first codec 510 may be provided a semiconductor chip form and compresses an image, inputted through the camera module 100, using a light weight compression method, such as a JPEG method.

The first codec 510 consumes relatively low power because it performs light weight compression on an image.

The first temporary storage unit 550 may be memory that consumes lower power, such as Low Power DDR (LPDDR), and temporarily stores an image compressed through the first codec 510.

The first temporary storage unit 550 may be memory having a capacity, which may store an image for a predetermined time of about 10 seconds.

The second codec 710 may be provided in a semiconductor chip form, and compresses an image inputted through the camera module 100 using a heavy weight compression method, such as an H.264 method.

The second codec 710 consumes relatively high power because it performs heavy weight compression on an image.

The second temporary storage unit 750 may be provided as temporary memory, such as SDRAM, and temporarily stores an image compressed through the second codec 710.

The light weight compression and the heavy weight compression are classified based on a compression rate. A compression rate through the second codec 710 is relatively higher than a compression rate through the first codec 510. Accordingly, the amount of image data compressed through the second codec 710 is relatively smaller than the amount of image data compressed through the first codec 510.

The main storage unit 770 may be provided as flash memory, such as an SD card, and receives an image stored in the first temporary storage unit 550 and the second temporary storage unit 750 and stores the received image.

The image storage system of the vehicle black box configured as described above according to the present invention operates as in a first embodiment, a second embodiment, and a third embodiment.

First Embodiment

Figure 3:
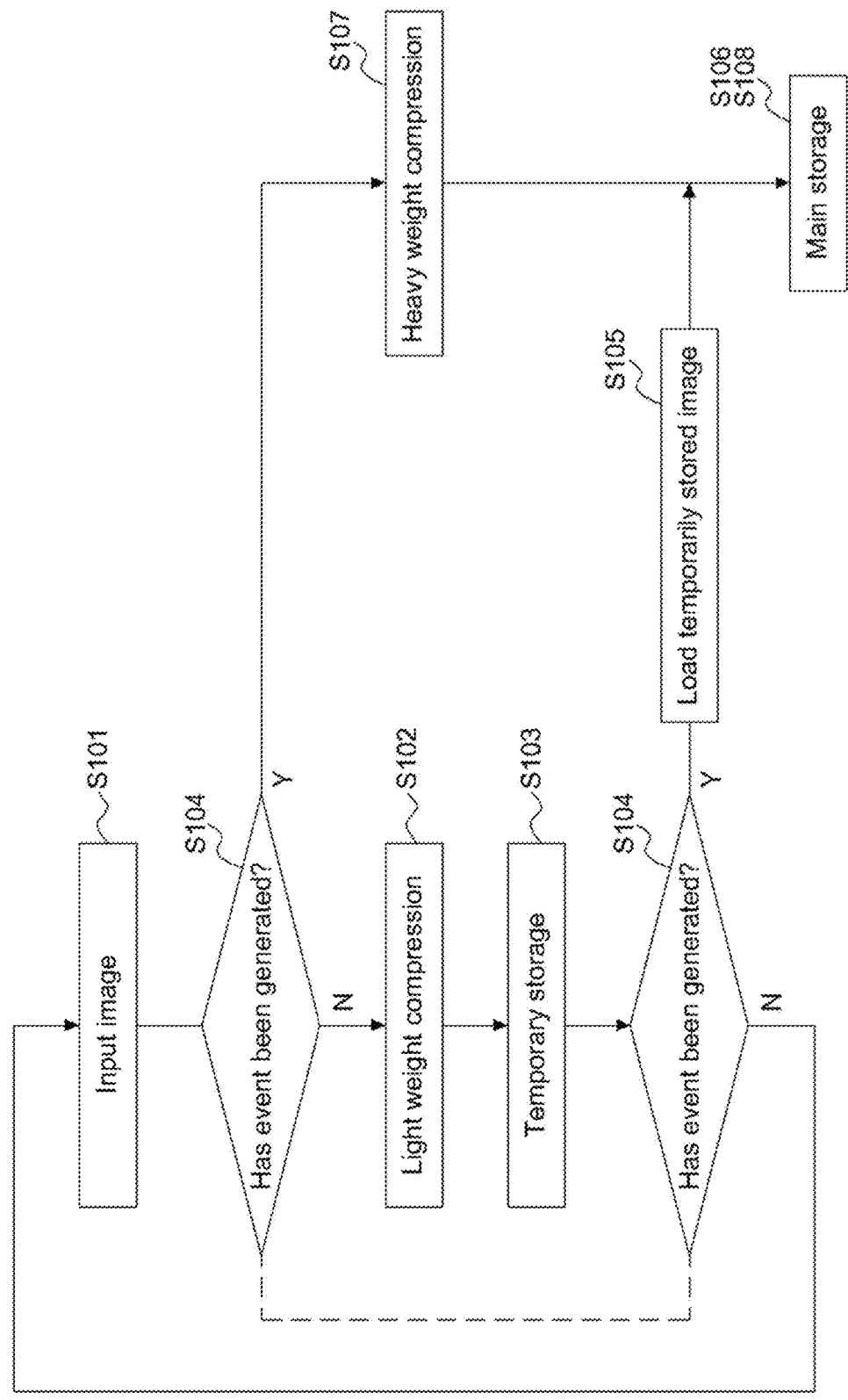
FIG. 3 is a flowchart shown to illustrate a method for storing an image in the vehicle black box according to a first embodiment of the present invention.

First, in an image storage method according to the first embodiment, as shown in FIG. 3, after a vehicle is parked, the black box installed on the vehicle operates in parking mode and receives an image captured through the camera module 100 (S101).

A threshold for sensing an event may be set in the vehicle black box for each sensor. The vehicle black box may determine that a previously designated event has been generated if a value measured by each sensor exceeds the threshold.

Accordingly, the vehicle black box senses whether an event according to a predetermined criterion is generated. When the event is not generated, an image inputted through the camera module 100 is subjected to light weight compression according to the JPEG method through the first codec 510 of the temporary processing unit 500 (S102) and is then temporarily stored in the first temporary storage unit 550 (S103).

Figure 4:
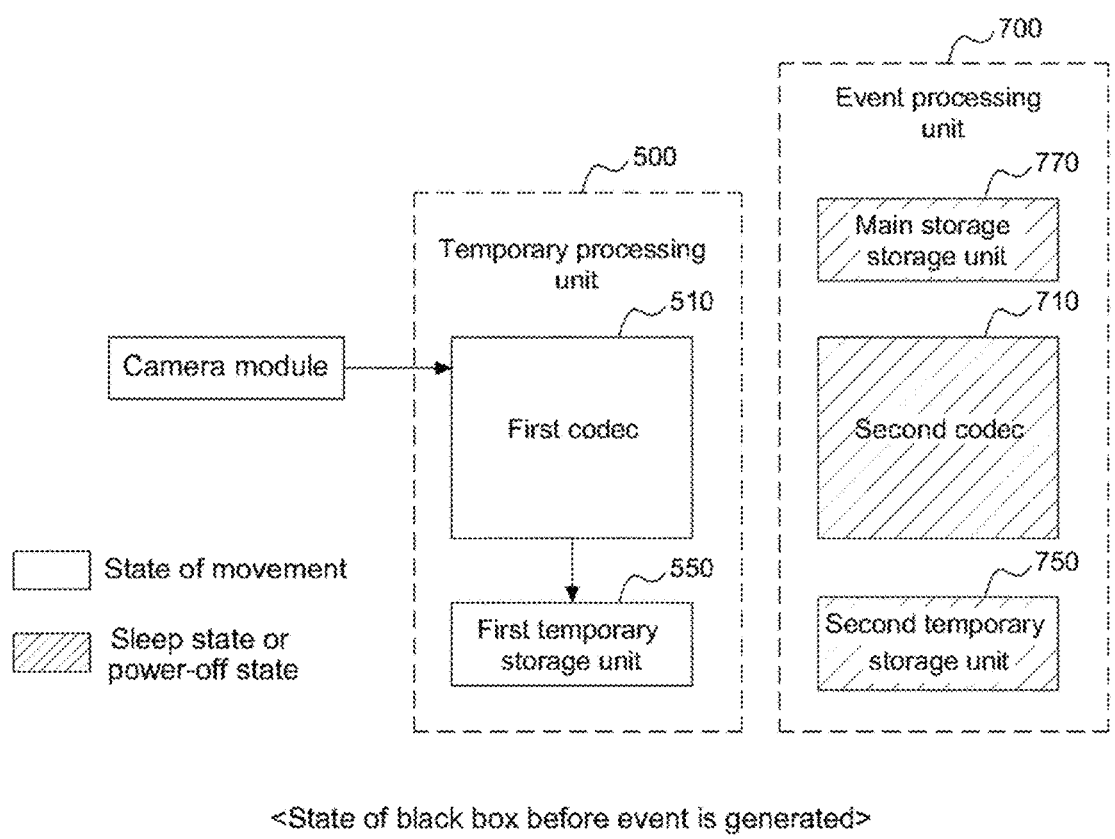
FIG. 4 is an exemplary diagram showing the state of the vehicle black box prior to the generation of an event according to the first embodiment of the present invention.

At this time, as shown in FIG. 4, the second codec 710, second temporary storage unit 750, and main storage unit 770 of the event processing unit 700 become a sleep state or a power-off state and thus consume low power, and the temporary processing unit 500 consumes relatively low power. Accordingly, power consumed by the vehicle black box before the event is generated is small.

Such a process is step for performing light weight compression on an image inputted before an event is generated through the first codec 510 (S102), storing the compressed image in the first temporary storage unit (S103), and making the event processing unit 700 the sleep or power-off state, which corresponds to a temporary storage step prior to the generation of the event.

Next, an event storage step, that is, step for processing an image of an event after the event is generated and finally storing the image in the main storage unit 770, is performed.

The same is true of other embodiments.

Figure 5:
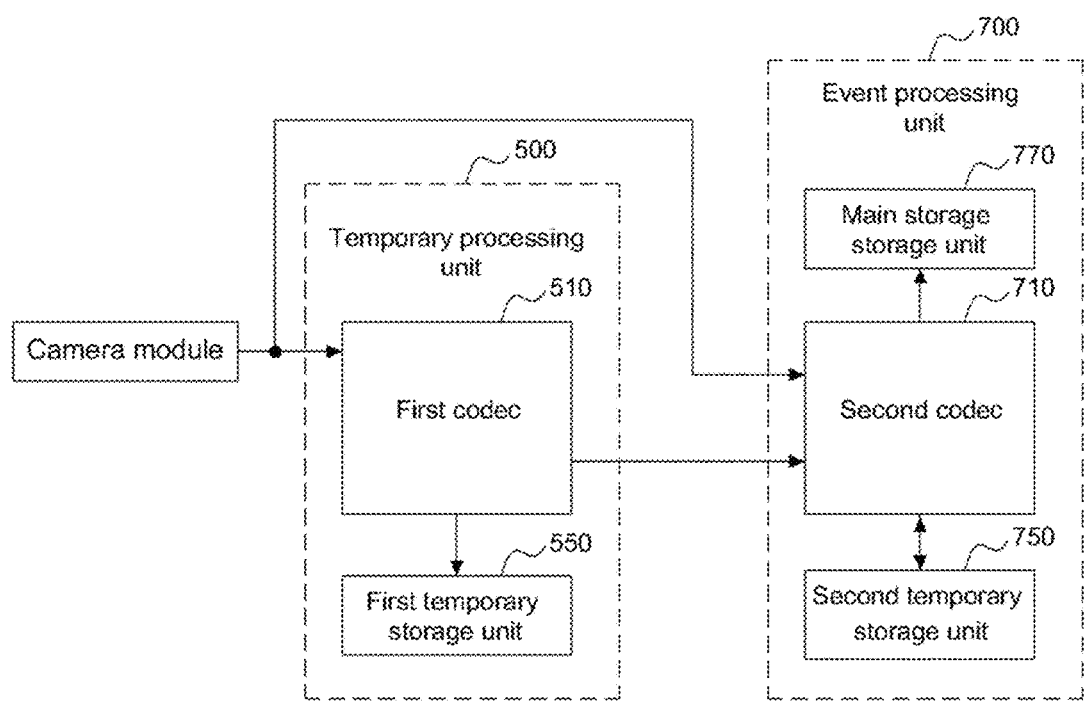
FIG. 5 is an exemplary diagram showing an image data flow state of the vehicle black box when an event is generated according to a first embodiment of the present invention.

When an event according to a predetermined criterion is generated while an image is captured (S104), an image subjected to light weight compression and temporarily stored in the first temporary storage unit 550 until the event is generated is loaded (S105), transferred to the event processing unit 700, and then stored in the main storage unit 770 (S106), as shown in FIG. 5.

Next, an image inputted to the camera module 100 after the event is generated is inputted to the event processing unit 700, temporarily stored in the second temporary storage unit 750, subjected to heavy weight compression according to the H.264 method through the second codec 710 (S107), and then stored in the main storage unit 770 (S108).

Figure 6:
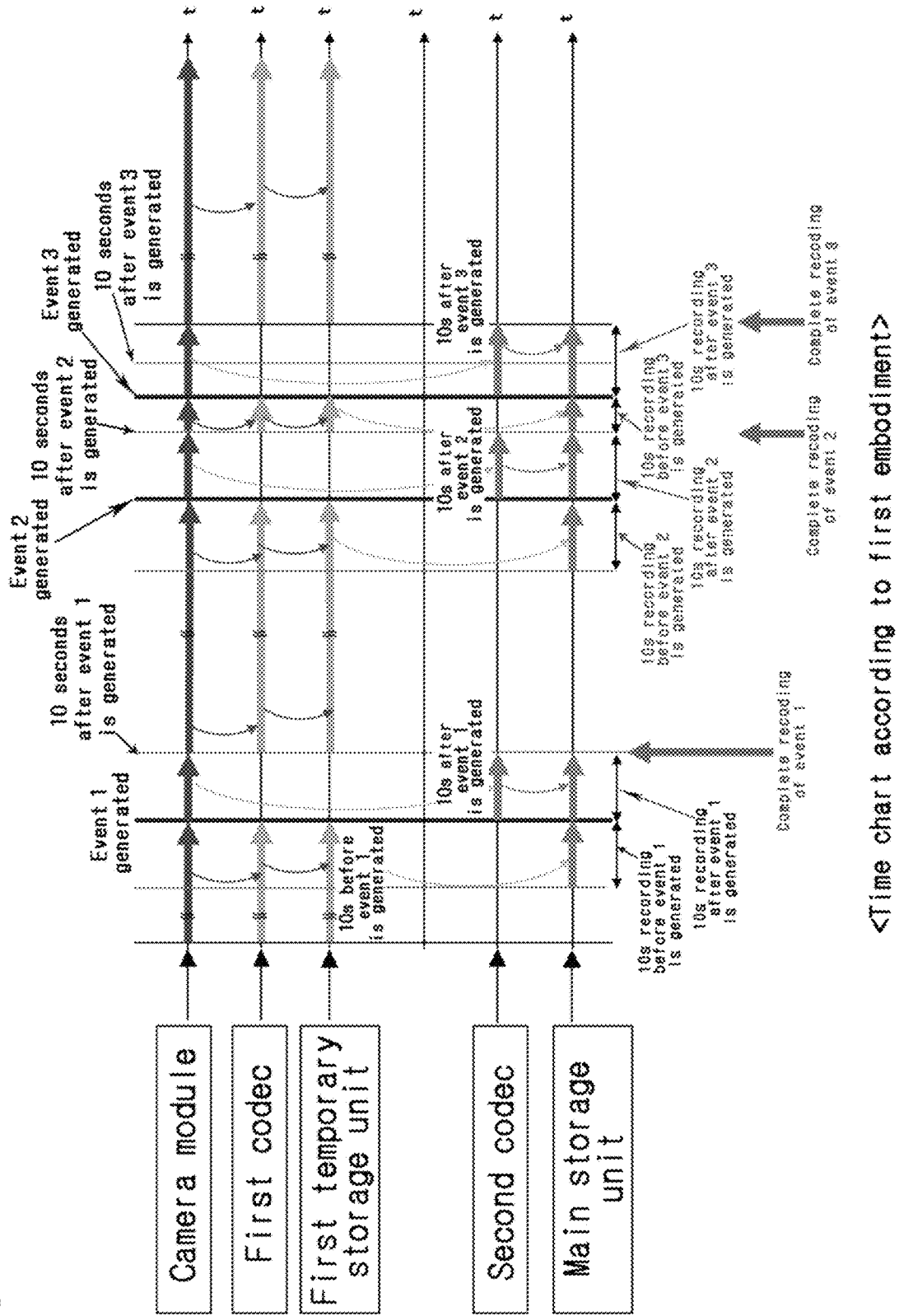
FIG. 6 is a time chart shown to illustrate a method for storing an image in the vehicle black box according to a first embodiment of the present invention.

For example, as shown in FIG. 6, the image inputted through the camera module 100 is subjected to light weight compression according to the JPEG method through the first codec 510 which consumes relatively low power and is stored in the first temporary storage unit 550. Thereafter, an event 1 is generated.

When the event 1 is generated, an image that has been stored in the first temporary storage unit 550 and corresponds to 10 seconds before the event 1 is generated is immediately stored in the main storage unit 770. An image inputted for 10 seconds after the event 1 is generated is subjected to heavy weight compression according to the H.264 method through the second codec 710 and then stored in the main storage unit 770, thereby fully storing the image of the event 1.

Next, an image inputted through the camera module 100 is subjected to light weight compression according to the JPEG method through the first codec 510 and then stored in the first temporary storage unit 550. Thereafter, an event 2 is generated.

As in the case of the event 1, when the event 2 is generated, an image that has been stored in the first temporary storage unit 550 and corresponds to 10 seconds before the event 2 is generated is immediately stored in the main storage unit 770. An image inputted for 10 seconds after the event 2 is generated is subjected to heavy weight compression according to the H.264 method through the second codec 710 and is then stored in the main storage unit 770, thereby fully storing the image of the event 2 in the main storage unit 770.

Thereafter, although an event 3 is generated, an image stored in the first temporary storage unit 550 before the event 3 is generated is immediately stored in the main storage unit 770. An image captured for 10 seconds after the event 3 is generated is subjected to heavy weight compression according to the H.264 method through the second codec 710 and is then stored in the main storage unit 770, thereby fully storing the image of the event 3.

Second Embodiment

Figure 7:
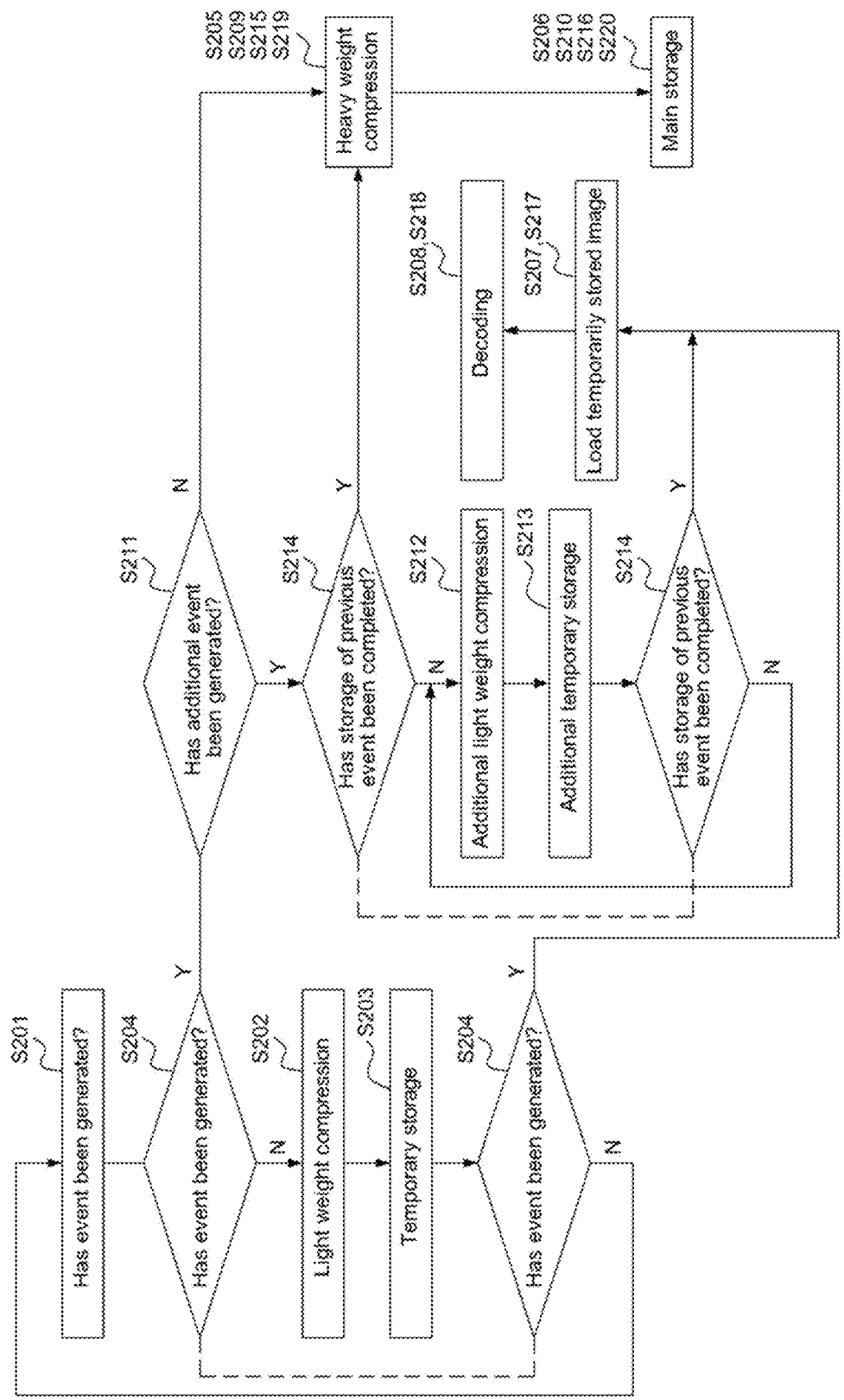
FIG. 7 is a flowchart shown to illustrate a method for storing an image in the vehicle black box according to a second embodiment of the present invention.

In the second embodiment, an event storage step performed when the current event, that is, a new additional event, is generated before an image of an event that is previously generated is fully stored, is chiefly described. In an image storage method according to the second embodiment, as shown in FIG. 7, after a vehicle is parked, the black box installed on the vehicle operates in parking mode and receives an image captured through the camera module 100 (S201).

As in the first embodiment, a threshold for sensing an event may be set in the vehicle black box for each sensor. If a value measured by each sensor exceeds the threshold, the vehicle black box may determine that a previously designated event has been generated.

Accordingly, the vehicle black box senses whether an event according to a predetermined criterion is generated. When the event is not generated, an image inputted through the camera module 100 is subjected to light weight compression according to the JPEG method through the first codec 510 of the temporary processing unit 500 (S202) and is temporarily stored in the first temporary storage unit 550 (S203), as shown in FIG. 4.

At this time, as in the first embodiment, the second codec 710, the second temporary storage unit 750, and the main storage unit 770 become a sleep state or a power-off state and thus consume low power, and the temporary processing unit 500 consumes relatively low power. Accordingly, consumption power in the vehicle black box before the event is generated is small.

Next, when the event according to the predetermined criterion is generated while an image is captured (S204), as shown in FIG. 5 of the first embodiment, an image inputted through the camera module 100 after the event is generated is inputted to the event processing unit 700, temporarily stored in the second temporary storage unit 750, subjected to heavy weight compression according to the H.264 method through the second codec 710 (S205), and then stored in the main storage unit 770 (S206).

The process so far is the same as that of the first embodiment.

Figure 8:
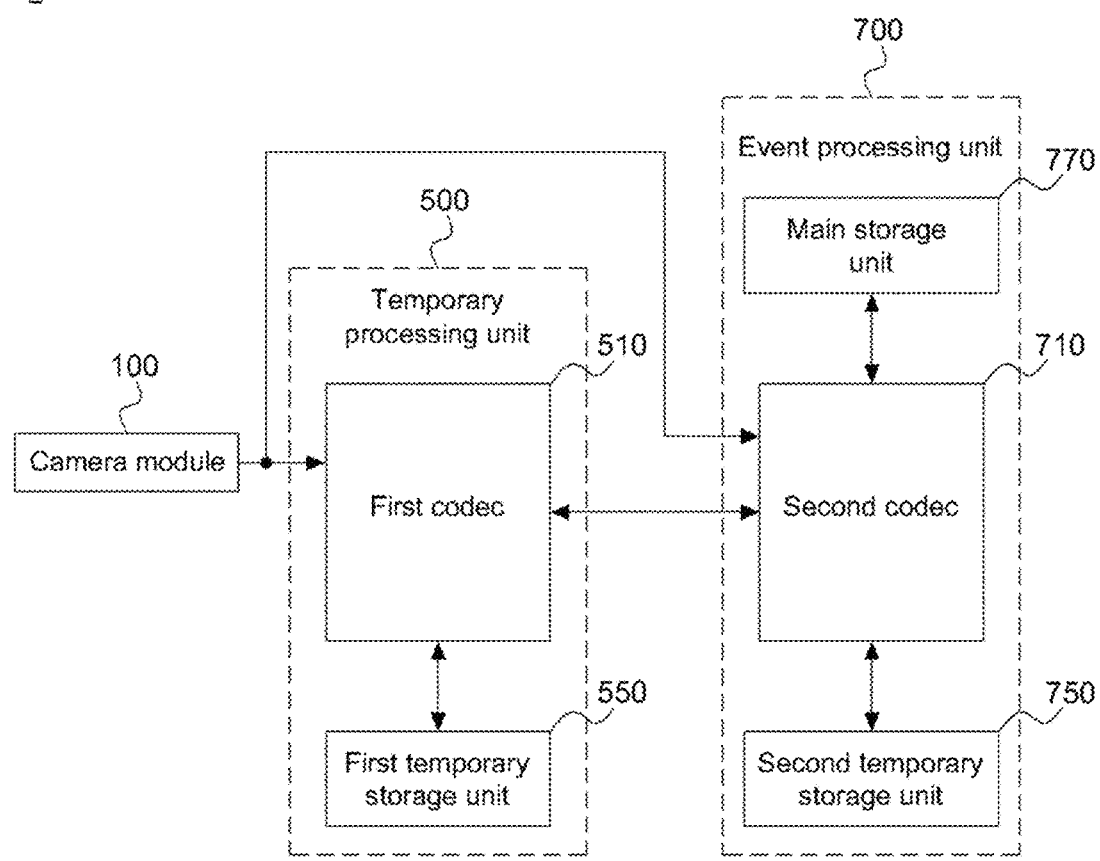
FIG. 8 is an exemplary diagram showing an image data flow state of the vehicle black box when an event is generated according to a second embodiment of the present invention.

Next, as shown in FIG. 8, an image subjected to light weight compression and temporarily stored in the first temporary storage unit 550 until the event is generated is loaded (S207), decoded through the first codec 510 (S208), transferred to the event processing unit 700, and then temporarily stored in the second temporary storage unit 750. Thereafter, the temporarily stored image is subjected to heavy weight compression according to the H.264 method through the second codec 710 (S209) and then stored in the main storage unit 770 (S210).

Meanwhile, a new additional event may be generated before the process of the light weight-compressed image, temporarily stored in the first temporary storage unit 550 being subjected to heavy weight compression through the second codec 710 and then being stored in the main storage unit 770, that is, the storage of the image of the previous event, is completed (S211).

In this case, an image of the additional event is unable to be stored in the event processing unit 700 until the storage of the image of the previous event is completed. Accordingly, an image inputted to the camera module 100 before the additional event is generated and an image for a specific time after the additional event is generated, that is, an image inputted to the camera module 100 until the storage of the image of the previous event is completed through the event processing unit 700, are subjected to light weight compression according to the JPEG method through the first codec 510 (S212), and is then temporarily stored in the first temporary storage unit 550 of the temporary processing unit 500 (S213).

Next, when the image of the previous event is fully stored in the event processing unit 700 (S214), an image inputted to the camera module 100 is inputted to the event processing unit 700, temporarily stored in the second temporary storage unit 750, subjected to heavy weight compression according to the H.264 method through the second codec 710 (S215), and then stored in the main storage unit 770 (S216).

Next, the image that has been stored in the temporary storage unit 300, that is, the image inputted to the camera module 100 and temporarily stored in the temporary storage unit 300 until the image of the previous event is fully stored through the event processing unit 700, is loaded (S217), decoded through the first codec 510 (S218), transferred to the event processing unit 700, and then temporarily stored in the second temporary storage unit 750. Thereafter, the temporarily stored image is subjected to heavy weight compression according to the H.264 method through the second codec 710 (S219) and is then stored in the main storage unit 770 (S220).

Figure 9:
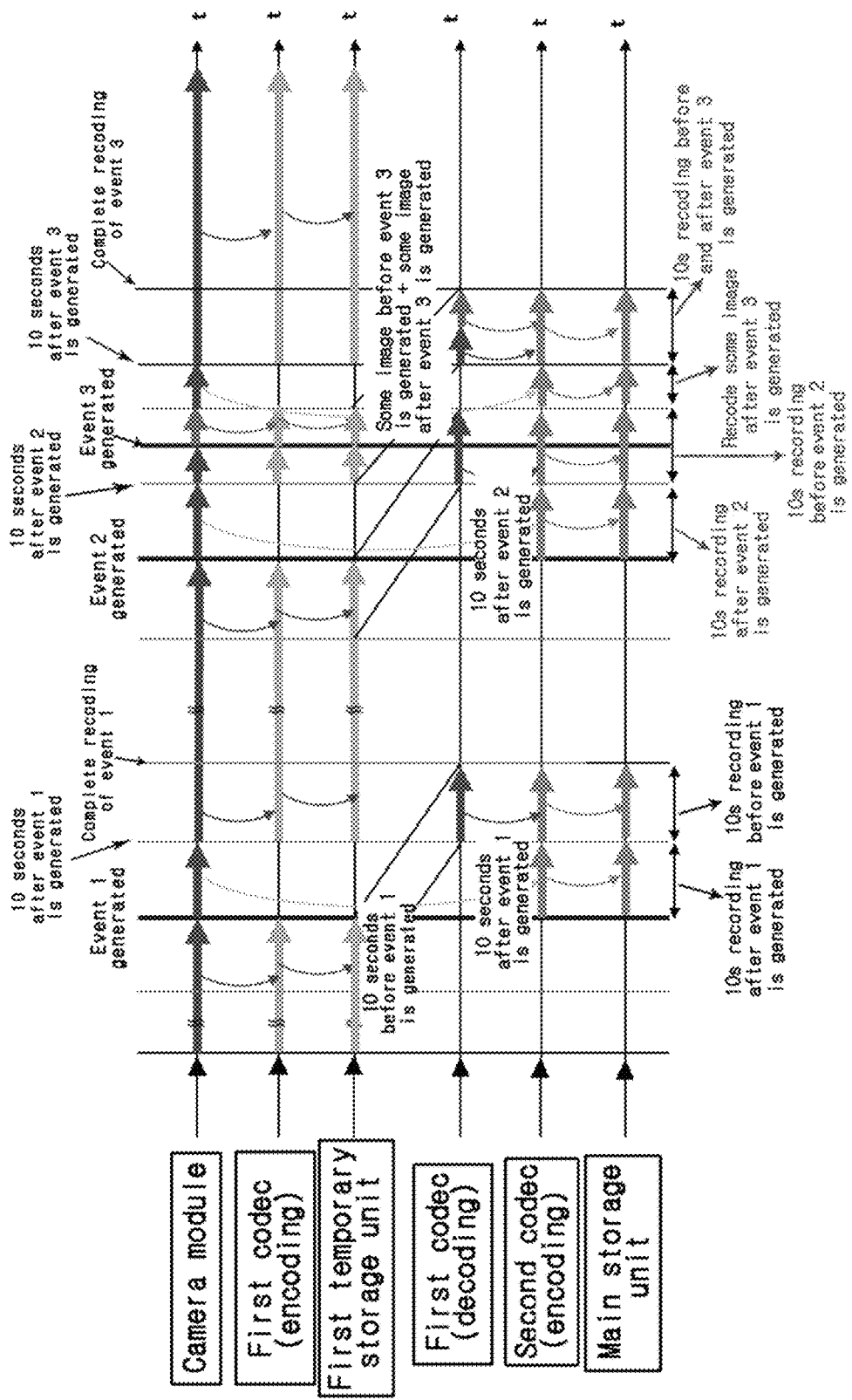
FIG. 9 is a time chart shown to illustrate a method for storing an image in the vehicle black box according to a second embodiment of the present invention.

For example, as shown in FIG. 9, an image inputted through the camera module 100 is subjected to light weight compression according to the JPEG method through the first codec 510 consuming relatively low power and is then stored in the first temporary storage unit 550. Thereafter, an event 1 is generated.

When the event 1 is generated, an image inputted for 10 seconds after the event 1 is generated is subjected to heavy weight compression according to the H.264 method through the second codec 710 and is then stored in the main storage unit 770.

Next, a 10-second image subjected to light weight compression and temporarily stored in the first temporary storage unit 550 before the event 1 is generated is decoded through the first codec 510, subjected to heavy weight compression according to the H.264 method through the second codec 710, and then stored in the main storage unit 770, thereby completing the storage of the image of the event 1.

Next, an image inputted through the camera module 100 is subjected to light weight compression according to the JPEG method through the first codec 510 and then stored in the first temporary storage unit 550. Thereafter, an event 2 is generated.

When the event 2 is generated, an image inputted for 10 seconds after the event 2 is generated is subjected to heavy weight compression according to the H.264 method through the second codec 710 and then stored in the main storage unit 770, as in the case of the event 1.

Next, a 10-second image subjected to light weight compression and temporarily stored in the first temporary storage unit 550 before the event 2 is generated is decoded through the first codec 510, subjected to heavy weight compression according to the H.264 method through the second codec 710, and then stored in the main storage unit 770, thereby being capable of completing the storage of the image of the event 2.

At this time, an event 3 may be generated before the image of the event 2 is fully stored in the main storage unit 770.

The storage of an image of the event 3 is unable to be processed through the event processing unit 700 until the image of the event 2 is fully stored in the main storage unit 770. Accordingly, an image inputted to the camera module 100 until the storage of the image of the event 2 is completed through the event processing unit 700, that is, some of an image before the event 3 is generated and some of an image after the event 3 is generated, are subjected to light weight compression according to the JPEG method through the first codec 510 and are then temporarily stored in the first temporary storage unit 550.

Next, when the image of the event 2 is fully stored in the main storage unit 770, some of the image of the event 3 inputted to the camera module 100 is subjected to heavy weight compression through the second codec 710 and then stored in the main storage unit 770. Next, some of the image stored in the first temporary storage unit 550 before the event 3 is generated and some of the image stored in the first temporary storage unit 550 after the event 3 is generated until the image of the event 2 is fully stored in the main storage unit 770 are decoded, subjected to heavy weight compression through the second codec 710, and then stored in the main storage unit 770, thereby completing the storage of the image of the event 3.

Third Embodiment

Figure 10:
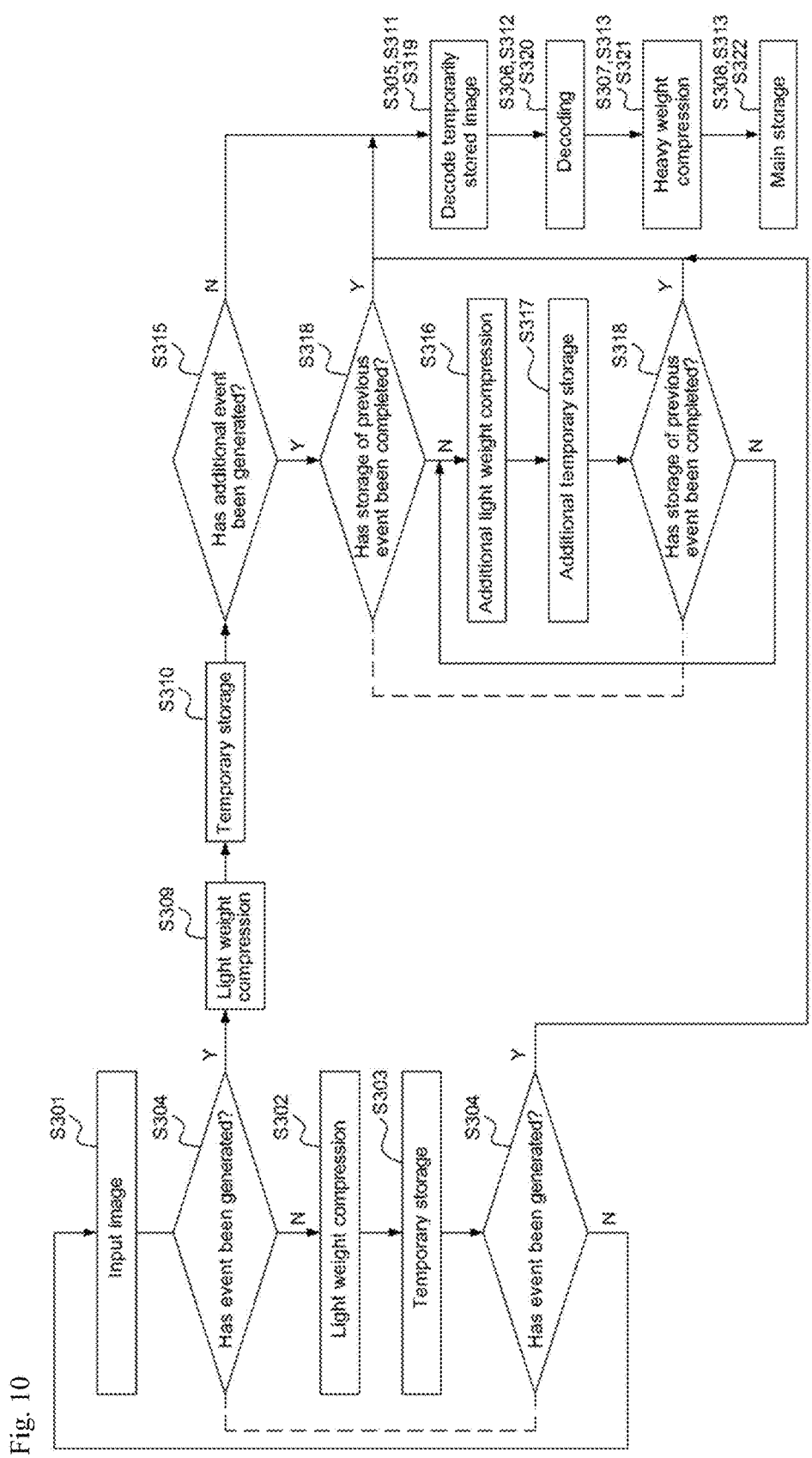
FIG. 10 is a flowchart shown to illustrate a method for storing an image in the vehicle black box according to a third embodiment of the present invention.
Figure 11:
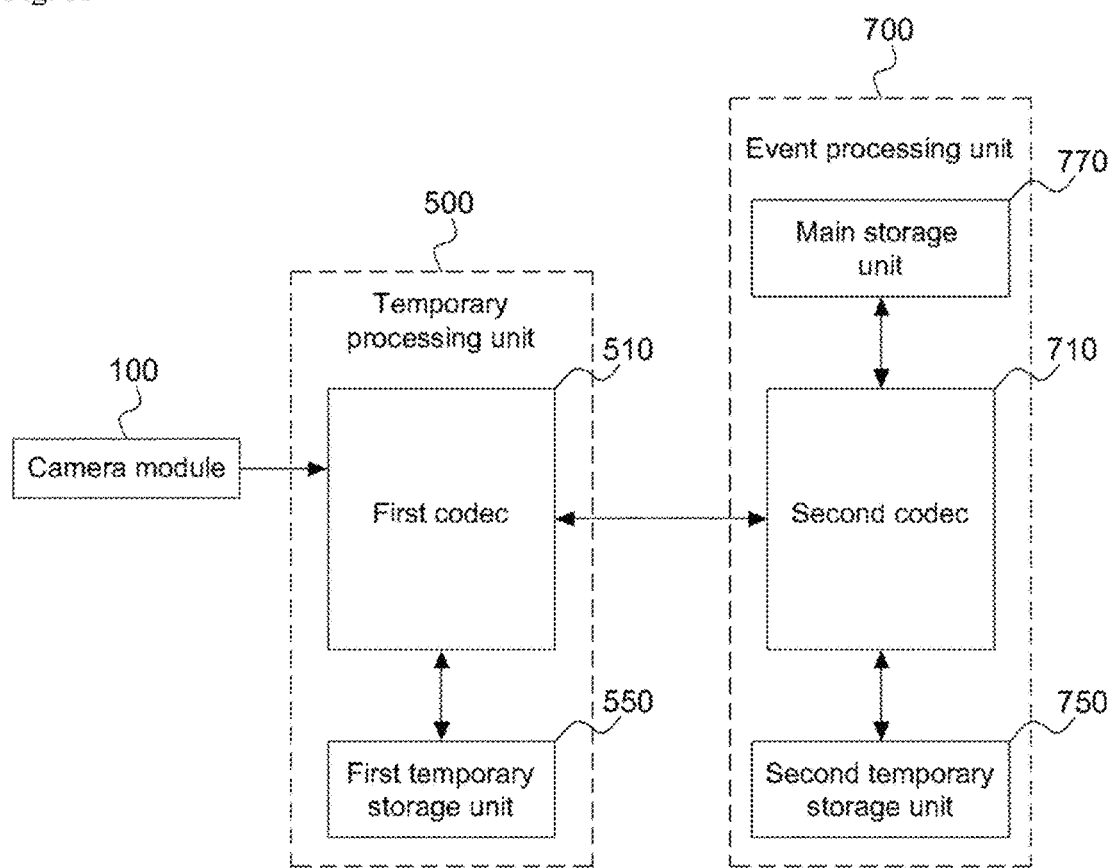
FIG. 11 is an exemplary diagram showing a data flow state of the vehicle black box when an event is generated according to a third embodiment of the present invention.

In an image storage method according to the third embodiment, as shown in FIG. 10, after a vehicle is parked, the black box installed on the vehicle operates in parking mode and receives an image captured through the camera module 100 (S301).

As in the first embodiment and the second embodiment, a threshold for sensing an event may be set in the vehicle black box for each sensor. The vehicle black box may determine that a previously designated event has been generated if a value measured by each sensor exceeds the threshold.

Accordingly, the vehicle black box senses whether an event according to a predetermined criterion is generated. When the event is not generated, an image inputted through the camera module 100 is subjected to light weight compression according to the JPEG method through the first codec 510 of the temporary processing unit 500 (S302) and is then temporarily stored in the first temporary storage unit 550 (S303), as shown in FIG. 4.

At this time, as in the first embodiment and the second embodiment, the second codec 710, the second temporary storage unit 750, and the main storage unit 770 become a sleep state or a power-off state and thus consume low power, and the temporary processing unit 500 consumes relatively low power. Accordingly, power consumed in the vehicle black box before the event is generated is small.

Figure 12:
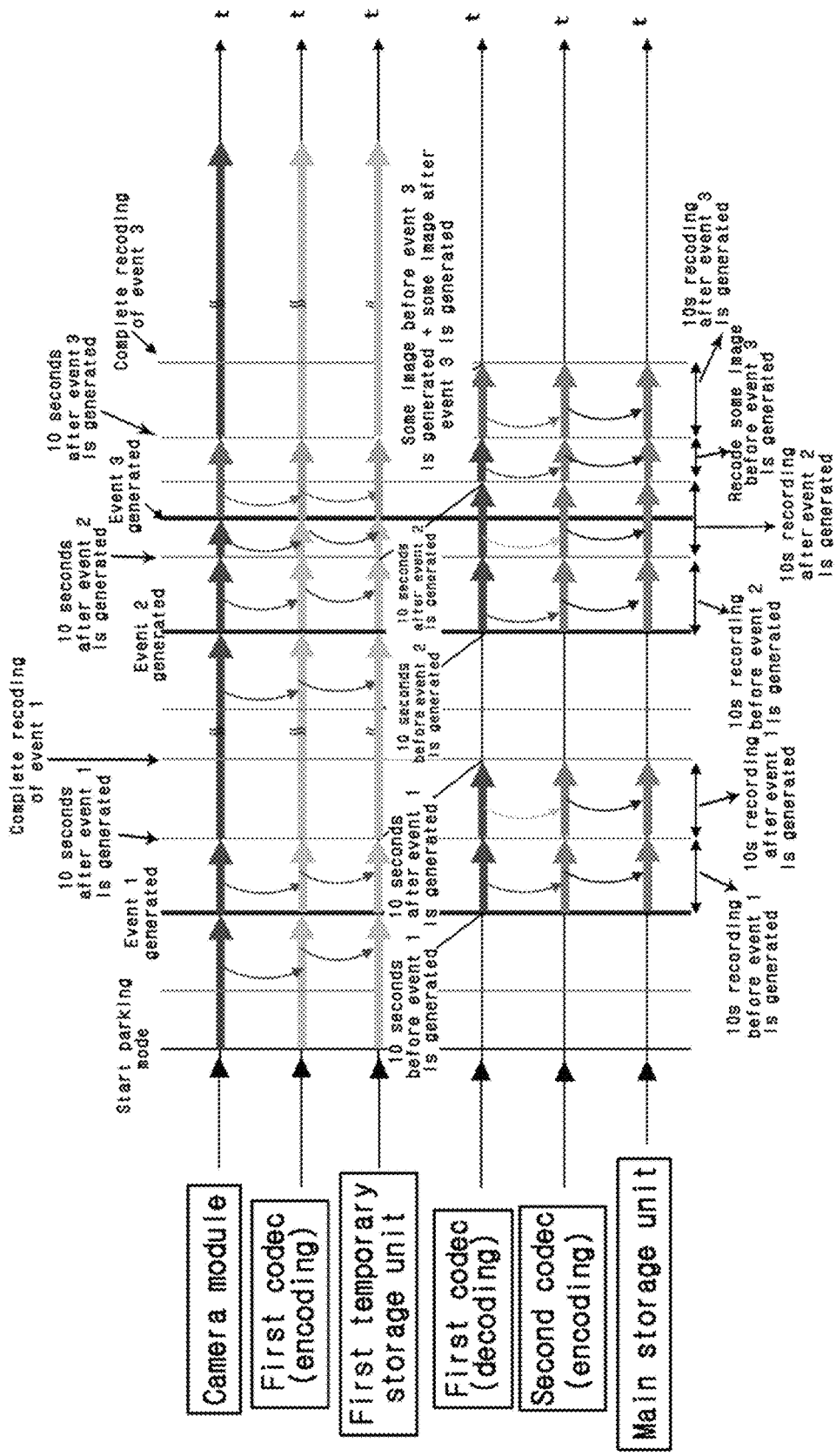
FIG. 12 is a time chart shown to illustrate a method for storing an image in the vehicle black box according to a third embodiment of the present invention.

Next, when the event according to the predetermined criterion is generated while an image is captured (S304), an image subjected to light weight compression and temporarily stored in the first temporary storage unit 550 until the event is generated is loaded (S305), decoded through the first codec 510 (S306), transferred to the event processing unit 700, and then temporarily stored in the second temporary storage unit 750. Thereafter, the temporarily stored images is subjected to heavy weight compression according to the H.264 method through the second codec 710 (S307) and then stored in the main storage unit 770 (S308), as shown in FIG. 12.

Next, an image inputted through the camera module 100 for a specific time after the event is generated is subjected to light weight compression through the first codec 510 (S309) and then temporarily stored in the first temporary storage unit 550 (S310). Next, the temporarily stored light weight-compressed image is loaded onto the first temporary storage unit 550 (S311), decoded through the first codec 510 (S312), transferred to the event processing unit 700, and then temporarily stored in the second temporary storage unit 750. Thereafter, the temporarily stored image is subjected to heavy weight compression according to the H.264 method through the second codec 710 (S313) and then stored in the main storage unit 770 (S314).

Meanwhile, a new additional event may be generated in the process of the light weight-compressed image, temporarily stored in the temporary storage unit 300, being subjected to the heavy weight compression through the second codec 710 and being stored in the main storage unit 770, that is, before the image of the previous event that is in progress is fully stored (S315).

The storage of an image of the additional event is unable to be processed through the event processing unit 700 until the storage of the image of the previous event is completed. Accordingly, an image inputted to the camera module 100 before the additional event is generated and an image inputted to the camera module 100 for a specific time after the additional event is generated, that is, until the storage of the image of the previous event is completed through the event processing unit 700, are subjected to light weight compression according to the JPEG method through the first codec 510 (S316) and then temporarily stored in the first temporary storage unit 550 of the temporary processing unit 500 (S317).

Next, when the storage of the image of the previous event is completed through the event processing unit 700 (S318), the image inputted to the camera module 100 and temporarily stored until the storage of the image of the previous event is completed through the event processing unit 700 is loaded (S319), decoded through the first codec 510 (S320), transferred to the event processing unit 700, and then temporarily stored in the second temporary storage unit 750. Thereafter, the temporarily stored image is subjected to heavy weight compression according to the H.264 method through the second codec 710 (S321) and then stored in the main storage unit 770 (S322).

Next, the image inputted to the camera module 100 from the completion of the previous event is also subjected to light weight compression according to the JPEG method through the first codec 510, temporarily stored in the first temporary storage unit 550 of the temporary processing unit 500, and then decoded through the first codec 510. Thereafter, the decoded image is transferred to the event processing unit 700, temporarily stored in the second temporary storage unit 750 (S319), subjected to heavy weight compression according to the H.264 method through the second codec 710, and then stored in the main storage unit 770 (S322).

For example, as shown in FIG. 12, an image inputted through the camera module 100 is subjected to light weight compression according to the JPEG method through the first codec 510 consuming relatively low power and then stored in the first temporary storage unit 550. Thereafter, an event 1 is generated.

When the event 1 is generated, a 10-second image subjected to light weight compression and stored in the first temporary storage unit 550 before the event 1 is generated is decoded through the first codec 510, subjected to heavy weight compression according to the H.264 method through the second codec 710, and then stored in the main storage unit 770.

Next, an image that is subjected to light weight compression and stored in the temporary storage unit 300 for 10 seconds after the event 1 is generated is decoded through the first codec 510, subjected to heavy weight compression according to the H.264 method through the second codec 710, and then stored in the main storage unit 770, thereby completing the storage of the image of the event 1.

Next, an image inputted through the camera module 100 is subjected to light weight compression according to the JPEG method through the first codec 510 and then stored in the first temporary storage unit 550. Thereafter, an event 2 is generated.

As in the case of the event 1, when the event 2 is generated, a 10-second image subjected to light weight compression and stored in the first temporary storage unit 550 before the event 2 is generated is decoded through the first codec 510, subjected to heavy weight compression according to the H.264 method through the second codec 710, and then stored in the main storage unit 770.

Next, an image subjected to light weight compression and stored in the temporary storage unit 300 for 10 seconds after the event 2 is generated is decoded through the first codec 510, subjected to heavy weight compression according to the H.264 method through the second codec 710, and then stored in the main storage unit 770. Accordingly, the storage of the image of the event 2 may be completed.

At this time, an event 3 may be generated before the storage of the image of the event 2 in the main storage unit 770 is completed.

The storage of an image of the event 3 is unable to be processed through the event processing unit 700 until the image of the event 2 is fully stored in the main storage unit 770. An image inputted to the camera module 100 until the storage of the image of the event 2 is completed through the event processing unit 700, that is, some of an image before the event 3 is generated and some of an image after the event is generated, are subjected to light weight compression according to the JPEG method through the first codec 510 and then temporarily stored in the first temporary storage unit 550.

Next, when the image of the event 2 is fully stored in the main storage unit 770, the image prior to the generation of the event 3 and some of the image after the generation of the event 3, which have been stored in the first temporary storage unit 550 until the image of the event 2 is fully stored in the main storage unit 770, are loaded, decoded, subjected to heavy weight compression through the second codec 710, and then stored in the main storage unit 770.

Next, some of the image of the event 3 inputted to the camera module 100 after the event 2 is completed is also stored in the first temporary storage unit 550, decoded, subjected to heavy weight compression through the second codec 710, and then stored in the main storage unit 770, thereby completing the storage of the image of the event 3.

As shown in the first embodiment, the second embodiment, and the third embodiment according to the present invention, when an event is not generated, a temporary storage step is performed in which an image inputted through the camera module 100 is subjected to light weight compression according to the JPEG method through the first codec 510 of the temporary processing unit 500 and then temporarily stored in the first temporary storage unit 550, and the second codec 710, second temporary storage unit 750, and main storage unit 770 of the event processing unit 700 operate in an inactive state.

Accordingly, power consumed by the vehicle black box can be generally reduced because only the temporary processing unit 500 consuming relatively low power with light weight compression operates instead of the event processing unit 700 consuming great power consumption before the event is generated.

Furthermore, the first embodiment of the present invention may be a storage method capable of storing an image of an event at high speed when the event is generated in parking mode because an image temporarily stored before an event is generated is stored in the main storage unit 770 without any conversion when the event is generated.

The second embodiment and the third embodiment are advantageous in that they can further reduce a storage space compared to the first embodiment because images right before and right after an event is generated are subjected to heavy weight compression when the event is generated and then stored in the main storage unit 770.

In particular, the second embodiment and the third embodiment propose a method for storing an image of a new event if the new event continues to occur while an image of an event that is in progress is processed.

Furthermore, the second embodiment is different from the third embodiment in that in the second embodiment, an image of a new event, that is, an image of a new event inputted during the processing of a previous event task, is temporarily stored in the temporary storage unit 500 and an image of the new event after the previous event is processed is directly stored in the main storage unit 770, whereas in the third embodiment, an image of a new event, that is, an image of a new event inputted during the processing of a previous event task, and an image of the new event after the processing of the previous event is completed are sequentially temporarily stored in the temporary storage unit 500 and then stored in the main storage unit 770.

Accordingly, in the second embodiment, an image of a new event can be stored at higher speed compared to the third embodiment.

The third embodiment is advantageous in that an image of a new event can be stored more stably because all of images of the new event are first sequentially stored in the temporary storage unit 500.

Meanwhile, the method for storing an image in the vehicle black box according to steps S101 to S108, S201 to S220, and S301 to S322 according to the present invention may be programmed and stored in a recording medium, such as CD-ROM, memory, ROM, or EEPROM so that it may be read by a computer.

Although the preferred embodiments of the present invention have been described in the above description, the present invention is not necessarily limited to some exemplary embodiment. It may be easily understood that those skilled in the art to which the present invention pertains may substitute, modify, and change the present invention in various ways without departing from the technical spirit of the present invention.

INDUSTRIAL APPLICABILITY

The present invention can reduce power consumed by the vehicle black box because the event processing unit consuming relatively high power becomes a sleep state or a power-off state and instead the temporary processing unit consuming relatively low power stores an image before an event is generated when an event is not generated in parking mode of the vehicle black box using the method for storing an image in the vehicle black box is used.

The invention claimed is:

1. A method for storing an image in a vehicle black box, comprising:
inputting an image captured through a camera module installed on the vehicle black box;
temporarily storing the inputted image in a temporary processing unit installed in the vehicle black box while an event processing unit being installed in the vehicle black box and consuming relatively high power becomes a sleep state or a power-off state when an event is not detected in the inputted image, wherein the temporary processing unit is configured to consume relatively low power;
setting a threshold for sensing the event via a sensor set in the black box and determining that the event is generated when a value measured by the sensor exceeds the threshold; and
when the event is detected in the inputted image after the temporary storing step,
storing images of the event for a specific time before the event is generated and for a specific time after the event is generated in the event processing unit, wherein the event processing unit is configured to return from the sleep state or the power-off state, the storing step comprising:
transferring and storing a light weight-compressed image from the temporary processing unit to the event processing unit, wherein the light weight-compressed image corresponds to the event for the specific time before the event is generated; and
storing a heavy weight-compressed image in the event processing unit, wherein the heavy weight-compressed image corresponds to the even for the specific time after the event is generated.

2. The method of claim 1, wherein in the storing images step, the images of the event for the specific time before the event is generated and for the specific time after the event is generated, comprising the image temporarily stored in the temporary processing unit, are stored in the event processing unit.

3. The method of claim 1, wherein the storing step comprises:
performing, by the event processing unit, heavy weight compression on an image inputted to the camera module for a specific time after the event is generated and storing the heavy weight-compressed image, and
transferring an image subjected to light weight compression and temporarily stored in the temporary processing unit for a specific time before the event is generated to the event processing unit, performing heavy weight compression on the transferred image, and then storing the heavy weight-compressed image.

4. The method of claim 1, wherein when a new event is generated before the storage of the image of the event is completed, the storing step further comprises:
performing, by the temporary processing unit, light weight compression on an image of the new event inputted to the camera module until the storage of the image of the event is completed and temporarily storing the light weight-compressed image; and
thereafter performing, by the event processing unit, heavy weight compression on an image of the new event inputted to the camera module after the storage of the image of the event is completed, storing the heavy weight-compressed image, transferring the image of the new event temporarily stored in the temporary processing unit to the event processing unit, performing heavy weight compression on the transferred image, and storing the heavy weight-compressed image.

5. The method of claim 1, wherein the storing step comprises:
performing, by the temporary processing unit, light weight compression on the images of the event for the specific time before the event is generated and for the specific time after the event is generated and temporarily storing the light weight-compressed images, and
transferring the light weight-compressed images temporarily stored in the temporary processing unit to the event processing unit, performing heavy weight compression on the images, and storing the heavy weight-compressed images in the event processing unit.

6. The method of claim 1, wherein when a new event is generated before the storage of the image of the event is completed, the storing step further comprises:
performing, by the temporary processing unit, light weight compression on an image of the new event inputted to the camera module until the storage of the image of the event is completed and temporarily storing the light weight-compressed image;
transferring the image of the new event temporarily stored in the temporary processing unit to the event processing unit, performing heavy weight compression on the transferred image, and storing the heavy weight-compressed after the storage of the image of the event is completed; and
performing, by the temporary processing unit, light weight compression on the image of the new event inputted to the camera module, temporarily storing the light weight-compressed image, performing, by the event processing unit, heavy weight compression on the light weight-compressed image and storing the heavy weight-compressed image.

7. The method of claim 3, wherein the storing step further comprises:
decoding the light weight-compressed image temporarily stored in the temporary processing unit, and
transferring the decoded image to the event processing unit.

8. A non-transitory computer-readable recording medium on which a program for executing the method for storing an image in the vehicle black box according to claim 1 has been recorded.

9. The method of claim 4, wherein the storing step further comprises:
decoding the light weight-compressed image temporarily stored in the temporary processing unit, and transferring the decoded image to the event processing unit.

10. The method of claim 5, wherein the storing step further comprises:

decoding the light weight-compressed image temporarily stored in the temporary processing unit, and transferring the decoded image to the event processing unit.

11. The method of claim 6, wherein the storing step further comprises:

decoding the light weight-compressed image temporarily stored in the temporary processing unit, and transferring the decoded image to the event processing unit.

\* \* \* \* \*